United States Patent
Grossman et al.

(10) Patent No.: US 10,230,932 B2
(45) Date of Patent: Mar. 12, 2019

(54) TECHNIQUES FOR ANIMATING TRANSITIONS BETWEEN NON-STEREOSCOPIC AND STEREOSCOPIC IMAGING

(71) Applicant: AUTODESK, Inc, San Rafael, CA (US)

(72) Inventors: Tovi Grossman, Toronto (CA); George Fitzmaurice, Toronto (CA); Natalia Bogdan, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 164 days.

(21) Appl. No.: 14/621,341

(22) Filed: Feb. 12, 2015

(65) Prior Publication Data
US 2015/0228102 A1  Aug. 13, 2015

Related U.S. Application Data

(60) Provisional application No. 61/939,664, filed on Feb. 13, 2014.

(51) Int. Cl.
| | |
|---|---|
| *H04N 13/359* | (2018.01) |
| *H04N 13/00* | (2018.01) |
| *H04N 13/144* | (2018.01) |
| *H04N 13/04* | (2006.01) |

(52) U.S. Cl.
CPC ....... *H04N 13/004* (2013.01); *H04N 13/0033* (2013.01); *H04N 13/0059* (2013.01); *H04N 13/0454* (2013.01); *H04N 13/144* (2018.05); *H04N 13/359* (2018.05)

(58) Field of Classification Search
None
See application file for complete search history.

(56) References Cited

U.S. PATENT DOCUMENTS

| | | | | |
|---|---|---|---|---|
| 2003/0012425 A1* | 1/2003 | Suzuki | ............... | G02B 27/0093 382/154 |
| 2012/0154390 A1* | 6/2012 | Narita | ................ | H04N 13/0022 345/419 |
| 2013/0016191 A1* | 1/2013 | Katayama | .......... | H04N 13/0022 348/49 |

(Continued)

*Primary Examiner* — William A Beutel
(74) *Attorney, Agent, or Firm* — Artegis Law Group, LLP

(57) ABSTRACT

In one embodiment of the present invention, a hybrid subsystem orchestrates animated transitions between stereoscopic imaging and non-stereoscopic imaging. In operation, the hybrid subsystem receives frames that represent a three-dimensional object over time. The hybrid subsystem renders the first frame based on a left eye position and then re-renders the first frame based a right eye position. The left eye position and the right eye position are separated by a predetermined distance that is optimized for stereoscopic viewing. As part of rendering and re-rendering subsequent frames, the hybrid subsystem gradually deceases the distance between the left eye position and the right eye position. Upon receiving a final frame in the transition, the hybrid subsystem renders once—to a single eye position. Advantageously, because the rendered three-dimensional object image gradually loses depth throughout the animated transition, the hybrid subsystem minimizes disruptions to the viewing experience.

17 Claims, 4 Drawing Sheets

(56) References Cited

U.S. PATENT DOCUMENTS

| | | | | |
|---|---|---|---|---|
| 2013/0136302 A1* | 5/2013 | Nam | ................ | G06K 9/00281 |
| | | | | 382/103 |
| 2013/0162641 A1* | 6/2013 | Zhang | ............... | H04N 13/0018 |
| | | | | 345/419 |
| 2014/0354786 A1* | 12/2014 | Takahashi | ......... | H04N 13/0454 |
| | | | | 348/51 |
| 2015/0071525 A1* | 3/2015 | Routhier | ............. | H04N 13/144 |
| | | | | 382/154 |

* cited by examiner

TECHNIQUES FOR ANIMATING TRANSITIONS BETWEEN NON-STEREOSCOPIC AND STEREOSCOPIC IMAGING

CROSS-REFERENCE TO RELATED APPLICATIONS

This application claims benefit of the U.S. Provisional Patent Application having Ser. No. 61/939,664 and filed on Feb. 13, 2014. The subject matter of this related application is hereby incorporated herein by reference.

BACKGROUND OF THE INVENTION

Field of the Invention

Embodiments of the present invention relate generally to computer science and, more specifically, to techniques for animating transitions between non-stereoscopic and stereoscopic imaging.

Description of the Related Art

Display devices enable both non-professional users and professional users to view images of three-dimensional (3D) objects. For example, televisions visually convey content representing 3D image sequences to audiences. Similarly, modeling software that transmits images to compatible display devices, such as computer displays, may allow software architects to interactively view models of houses.

In general, both the rendered image data and the display device conform to a standardized viewing mode that provides the illusion of 3D depth. In a non-stereoscopic mode, the illusion of 3D depth for each frame is attained using a single 2D image. By contrast, in a stereoscopic mode, the illusion of 3D depth for each frame is created using two offset 2D "stereoscopic" images of the frame. Notably, stereoscopic images can improve (among other things) depth perception and scene recognition, thereby increasing the realism of displayed images.

However, stereoscopic imaging gives rise to a discrepancy known as "vergence accommodation conflict," where the depth focus of the eyes, which is fixed at the display plane, is inconsistent with the perceived depth of the object being viewed. This discrepancy may cause eye strain and, with extended use, dizziness and/or nausea for users. Consequently, to reduce overall discomfort over time, users may watch an action movie in stereoscopic mode and the news in non-stereoscopic mode.

In addition, non-stereoscopic imaging and stereoscopic imaging each have advantages and disadvantages depending on the current activity being performed by the user. For example, while viewing in a stereoscopic imaging mode may ease certain tasks, such as interacting with a 3D model of a house, users often prefer to perform other tasks, such as viewing email, in a non-stereoscopic imagining mode.

For these reasons, stereoscopic displays often allow users to switch between stereoscopic and non-stereoscopic imaging modes. However transitioning between viewing stereoscopic images and non-stereoscopic images may be noticeably jarring to the user, thereby degrading the overall viewing experience of the user. Further, if a user frequently switches the imaging mode (e.g., when toggling between modelling a house and reading email), then the transitions between imaging modes may cause visual discomfort for the user.

As the foregoing illustrates, what is needed in the art are more effective techniques for transitioning between stereoscopic and non-stereoscopic imaging.

SUMMARY OF THE INVENTION

One embodiment of the present invention sets forth a computer-implemented method for animating a transition between stereoscopic and non-stereoscopic imaging. The method includes receiving image data and a mode; determining a state based on the mode; if the state is a stable state and the mode is a stereographic mode, then setting an offset to a predetermined eye separation distance that is greater than zero; if the state is a stable state and the mode is a non-stereographic mode, then setting the offset to zero; if the state is a transition state, then setting the offset to a value that is less than the predetermined eye separation distance and greater than zero; calculating a left eye position and a right eye position, where the right eye position is separated from the left eye position by the offset; generating a left eye image for display based on the left eye position and the image data; and generating a right eye image for display based on the right eye position and the image data.

One advantage of the disclosed techniques is that gradually transitioning between stereoscopic and non-stereoscopic images improves the viewing experience for the user compared to conventional transition techniques. More specifically, because the gradual transition affords the user time to adjust to changes in the imaging mode, the disclosed techniques eliminate discomfort for the user that is typically associated with abrupt changes in perceived depth. Further, the incremental nature of the transition between stereoscopic and non-stereoscopic images enables the imaging modes to be more optimized for the user while reducing the impact on the overall viewing experience.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
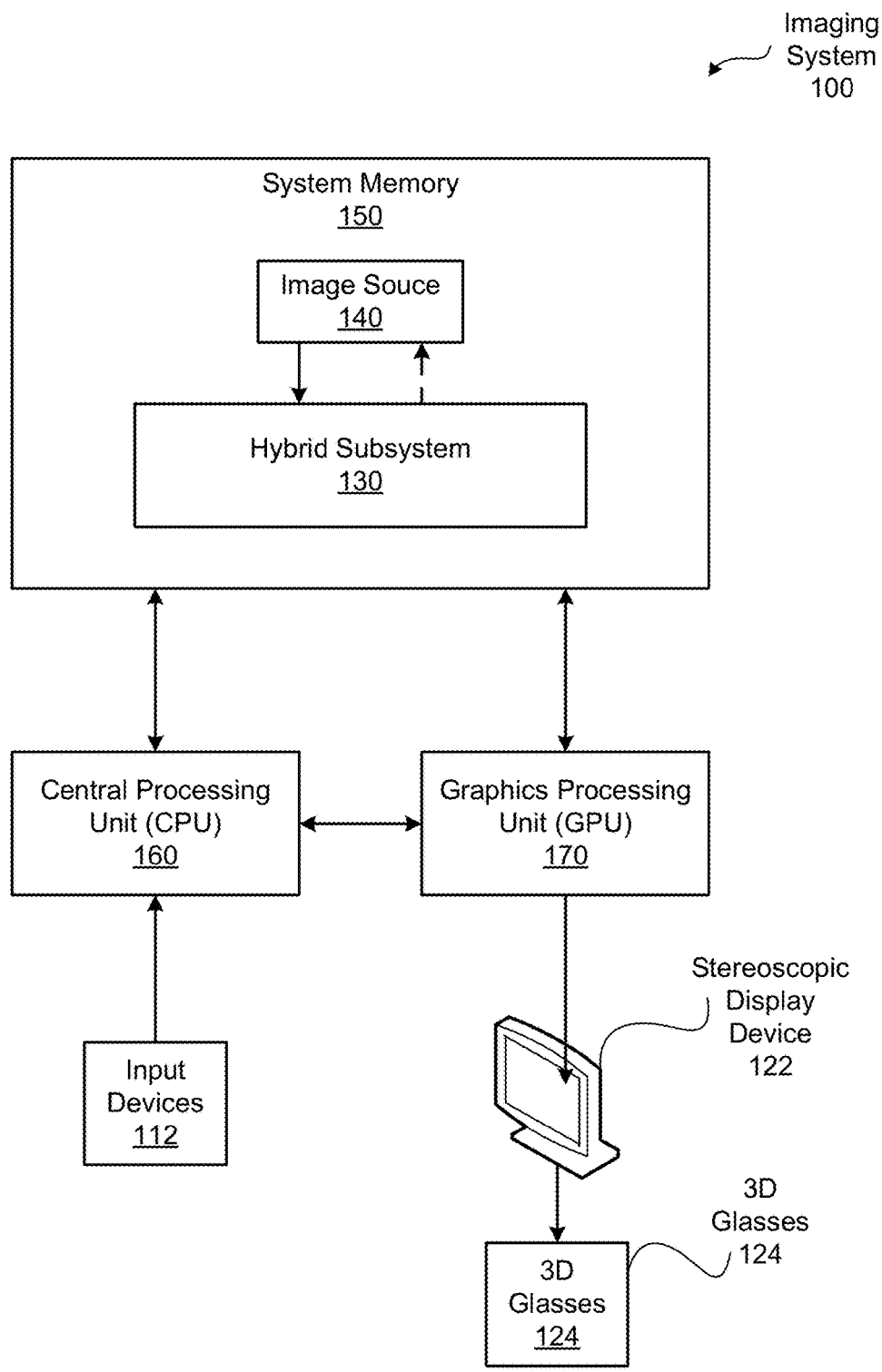
FIG. 1 is a block diagram illustrating an imaging system configured to implement one or more aspects of the present invention.

FIG. 1 is a block diagram illustrating an imaging system 100 configured to implement one or more aspects of the present invention. As shown, the imaging system 100 includes, without limitation, a central processing unit (CPU) 160, a system memory 150, a graphics processing unit (GPU) 170, input devices 112, a stereoscopic display device 122, and three-dimensional (3D) glasses 124.

The CPU 160 is capable of receiving input user information from the input devices 112. The input devices 112 include two-dimensional (2D) input devices, such as a keyboard and a mouse, and 3D input devices such as hand tracking systems that convey the 3D positions of two markers placed on the user's thumb and index finger to enable free-hand spatial input. In alternate embodiments, any number, including zero, and type of 2D input devices and 3D input devices may be included in the imaging system 100.

In operation, the CPU 160 is the master processor of the imaging system 100, controlling and coordinating operations of other system components. In particular, the CPU 160 issues commands that control the operation of the GPU 170. The GPU 170 incorporates circuitry optimized for graphics and video processing, including, for example, video output circuitry. The GPU 170 delivers pixels to the stereoscopic display device 122 that may be any conventional device that is capable of processing separate, offset visual images—one for the left eye and one for the right eye—designed to convey a perception of 3D depth. In a stereoscopic mode, 3D glasses 124 ensue that each of the images is delivered to the corresponding eye.

In some embodiments, the stereoscopic display device 122 and the 3D glasses 124 implement "passive stereoscopic 3D." In passive stereoscopic 3D, the stereoscopic display device 122 and the 3D glasses 124 use polarization techniques to separate the left eye images and right eye images. In alternate embodiments, the GPU 170 delivers a synchronization signal and the stereoscopic display device 122 and the 3D glasses 124 implement "active stereoscopic 3D." The 3D glasses 124 in active stereoscopic 3D implementation alternatively present the left eye images and the right eye images. In yet other embodiments, the stereoscopic display device 122 implements "autostereoscopic 3D" techniques that provide the illusion of 3D depth without the 3D glasses 124. In such embodiments, the 3D glasses 125 are omitted from the imaging system 100. In general, the imaging system 100 may include any combination of output devices that compatibly support stereoscopic viewing.

Notably, the stereoscopic display device 122 included in the imaging system 100 also supports non-stereoscopic imaging. In non-stereoscopic imaging, for each frame, the GPU 170 renders a single image to be processed by both the left and right eyes—the offset between the images for the left and right eye is zero. In some embodiments, the 3D glasses 124 may coordinate with the stereoscopic display device 122 to provide non-stereoscopic imaging. In other embodiments, the user may elect to remove the 3D glasses 124 when the GPU 170 is generating non-stereoscopic image data. Regardless of the technology implemented for the stereoscopic display device 122 and the 3D glasses 124, the imaging system 100 supports both stereoscopic and non-stereoscopic viewing.

The system memory 150 stores content, such as software applications and data, for use by the CPU 160 and the GPU 170. During execution, each software application receives data from the input devices 112 and transmits either stereoscopic or non-stereoscopic output to the stereoscopic display device 122. For example, a text editing application may support a keyboard and a mouse and transmit 2D textual data as a single set of images intended to be viewed with both eyes to the stereoscopic display device 122.

As shown, the system memory 150 includes a hybrid subsystem 130 and an image source 140. The hybrid subsystem 130 is capable of providing both non-stereoscopic imaging and stereoscopic imaging based on the image source 140. In some embodiments, the hybrid subsystem 130 is configured to enable interaction with the image source 140—performing read and write operations on the image source 140. In alternate embodiments, the hybrid subsystem 130 provides read-only access to the image source 140.

The hybrid subsystem 130 enables dynamic selection of imaging modes. For example, when the user is performing a task that may be performed more efficiently using the depth cues provided by stereoscopic imaging, the hybrid subsystem 130 may operate in a stereoscopic imaging mode. However, viewing stereoscopic content for extended periods of time often causes eye strain and eye fatigue. Consequently, when the user is performing a task where stereoscopic imaging typically does not provide an improved user experience compared to non-stereoscopic imaging, the hybrid subsystem 130 may operate in a non-stereoscopic mode. In general, each of stereoscopic viewing and non-stereoscopic viewing has advantages and disadvantages, and the hybrid subsystem 130 optimizes the viewing mode automatically (e.g., based on the task being performed) and/or on-demand (e.g., based on a user selection of viewing mode).

In various embodiments, the hybrid subsystem 130 implements a variety of manual and/or automatic triggers designed to select the optimum viewing modes for each task. For example, in some embodiments, the hybrid subsystem 130 enables the user to trigger transitions between based on the position (flipped up or down) of the 3D glasses 124. In other embodiments, the hybrid subsystem 130 determines the optimal mode based on the current operation. In one such embodiment, suppose that hybrid subsystem 130 were operating in the non-stereoscopic mode. Subsequently, if the hybrid subsystem 130 were to detect a scene rotation operation, then the hybrid subsystem 130 would transition to the stereoscopic mode, thereby providing additional visual cues to the user.

However, conventional applications that support multiple viewing modes typically switch between viewing modes in an abrupt manner—immediately cutting from non-stereoscopic images to stereoscopic images and vice versa. Because such switches involve a sudden and dramatic change in convergence angle (i.e., the angle formed between the eye and an observed object), these switches are disruptive and uncomfortable for the users. Further, if the viewing mode is constantly switching back and forth between non-stereoscopic and stereoscopic, the viewing experience may be unacceptably degraded.

For this reason, the hybrid subsystem 130 is configured to smoothly and gradually transition between a stereoscopic imaging mode and a non-stereoscopic imaging mode. More specifically, as persons skilled in the art will recognize, in stereoscopic imaging, the image rendered for the left eye and the image rendered for the right eye are offset by a distance the corresponds to a "typical" separation between the two eyes. Conversely, in non-stereoscopic imaging, both eyes receive the same image, corresponding to an offset of zero. The hybrid subsystem 130 implements conventional stereoscopic imaging and non-stereoscopic imaging modes, but also provides an animated transition between the modes that incrementally adjusts the offset during a short transition time.

The hybrid subsystem 130 selects a transition time that allows the user time to adjust comfortably to the continually changing offset—often orchestrating transitions that occur unnoticed by the user. The hybrid subsystem 130 may select the transition time based on any number of factors including, without limitation, the transition direction and the depth of the objects in the image source 140. For example, in one embodiment, based on experimental data, the hybrid subsystem 130 is configured to implement one transition time when transitioning from the stereoscopic mode to the non-stereoscopic mode and a longer transition time when transitioning from non-stereoscopic mode to stereoscopic mode. In other embodiments, the hybrid subsystem 130 configures the transition time based on one or more preferences specified by the user. In alternate embodiments, the hybrid subsystem 130 implements an interactive automatic calibration process and then, based on user feedback during the calibration process, customizes the transition time for each user.

It will be appreciated that the imaging system 100 shown herein is illustrative and that variations and modifications are possible. The number of CPUs 160, the number of GPUs 170, the number of system memories 150, and the number of applications included in the system memory 159 may be modified as desired. Further, the connection topology between the various units in FIG. 1 may be modified as desired. In some embodiments, various components, such as the GPU 170, are omitted.

The components illustrated in the imaging system 100 may be included in any type of imaging system 100, e.g., laptop computers, tablet computers, televisions, Blu-ray players, and the like. Additionally, software applications illustrated in imaging system 100 may execute on distributed systems communicating over computer networks including local area networks or large, wide area networks, such as the Internet. Notably, the hybrid subsystem 130 described herein is not limited to any particular imaging system 100 and may be adapted to take advantage of new display technologies as they become available.

Further, data illustrated in the system memory 150 may instead be stored and transmitted to the hybrid subsystem 130 in any technically feasible fashion. For example, the image source 140 may be a movie, the hybrid subsystem 130 may be a television, and the movie may be "streamed" over the Internet to the television.

Optimizing Transitions Between Imaging Modes

Figure 2:
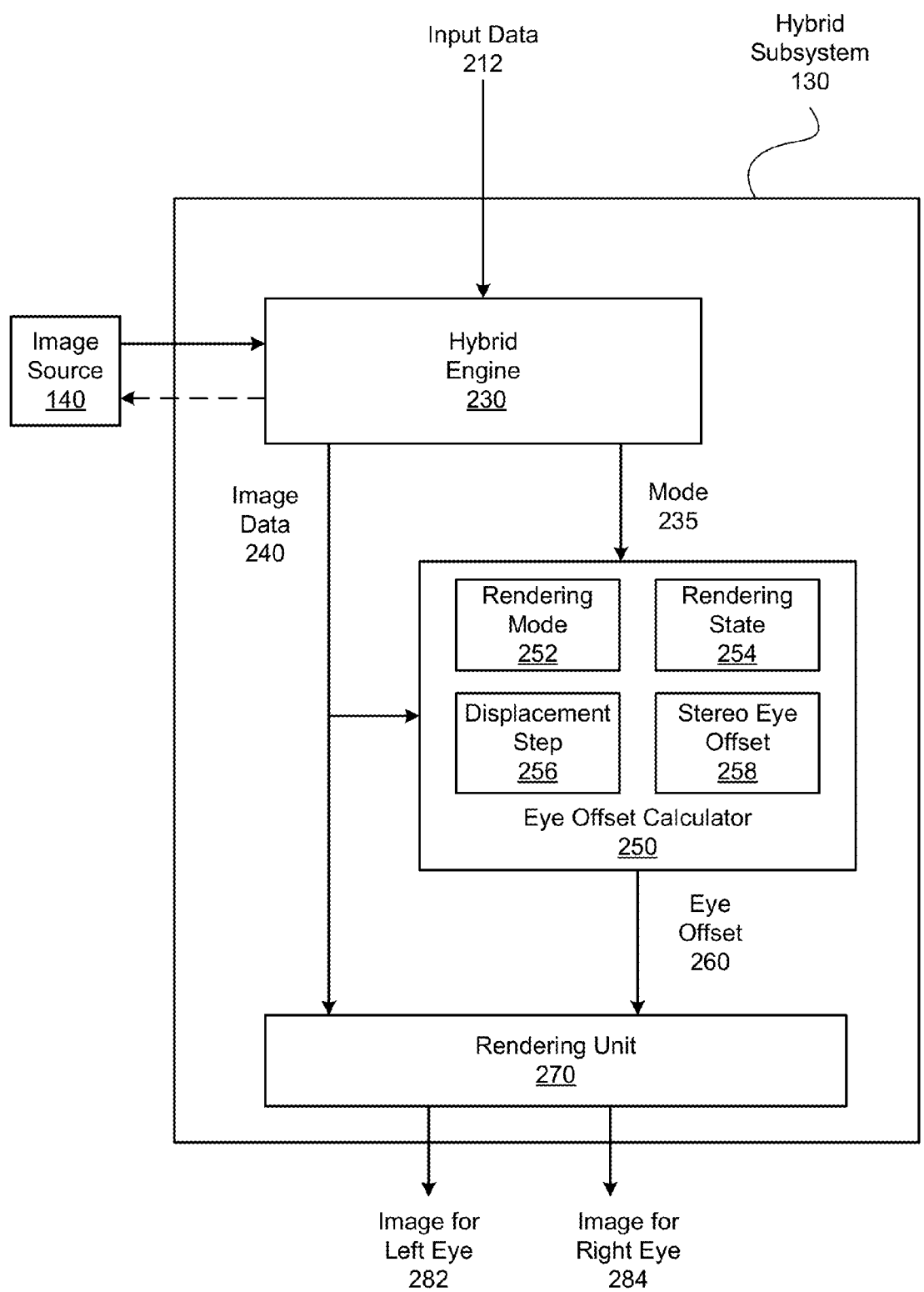
FIG. 2 is a block diagram illustrating the hybrid subsystem of FIG. 1, according to one embodiment of the present invention.

FIG. 2 is a block diagram illustrating the hybrid subsystem 130 of FIG. 1, according to one embodiment of the present invention. In general, the hybrid subsystem 130 generates an image for left eye 282 and an image for right eye 284 based on the image source 140 and, optionally, input data 212. As shown, the hybrid subsystem 130 includes, without limitation, a hybrid engine 230, an eye offset calculator 250, and a stereoscopic rendering unit 270.

In operation, the hybrid engine 230 receives the input data 212 and/or interacts with the image source 140, generating image data 240 for display via the stereoscopic rendering unit 270. In some embodiments, the hybrid engine 230 is configured to read data from the image source 140 without performing any additional operations (e.g., performing read operations on a Blu-ray disc). In other embodiments, the hybrid engine 230 is configured to interact with the image source 140 (e.g., enabling interactive modification of a 3D model based on the input data 212). For explanatory purposes only, the read operations are depicted with a solid arrow from the image source 140 to the hybrid engine 230, and the optional write operations are depicted with a dotted arrow from the hybrid engine 230 to the image source 140.

While generating image data 240 based on the image source 140, the hybrid engine 230 dynamically selects and sets a mode 235 that optimizes the viewing experience for the user. The mode 235 may be set to either a stereoscopic imaging mode or a non-stereoscopic imaging mode, and the hybrid engine 230 may assign the mode 235 in any technically feasible fashion. In some embodiments, the hybrid subsystem 130 implements any number of explicit triggers (e.g., a user-selectable imaging mode), and automatic triggers (e.g., switch from watching news to watching an action movie) in any combination. In some embodiments, the transition triggers are configurable to enable each user to efficiently tailor the input and output modes to individually optimize the viewing experience.

Selecting Offset Between Left and Right Eye Images

The hybrid engine 230 transmits the image data 240 and the mode 235 to the eye offset calculator 250 and, in response, the eye offset calculator 250 generates an eye offset 260 that enables a comfortable viewing experience for the user while minimizing transition times between imaging modes. As persons skilled in the art will recognize, the perception of depth for the user varies based on the eye offset 260 between the image for left eye 254 and the image for right eye 256. In general, as the eye offset 260 increases, the perceived depth of the image source 140 also increases. More specifically, an eye offset 260 of zero corresponds to a single eye position for both eyes and, consequently, non-stereoscopic imaging. By contrast, in stereoscopic imaging, the eye offset 260 is typically chosen to approximate the distance between the left and right eyes of users.

As shown, the eye offset calculator 250 includes a rendering mode 252, a rendering state 254, a stereo eye offset 258, and a displacement step 256. The rendering mode 252 corresponds to the value of the mode 235 (either stereoscopic mode or non-stereoscopic mode) that was received by the eye offset calculator 250 immediately preceding the current value of the mode 235. The rendering state 254 indicates whether the hybrid subsystem 130 is transitioning between imaging modes. The stereo eye offset 258 specifies the eye offset 260 when the rendering mode 252 is the stereoscopic mode and the rendering state 254 indicates that the imaging mode is stable. In some embodiments, the stereo eye offset 258 is a predetermined value and in other embodiments, the stereo eye offset 258 is user-configurable. As detailed below, the eye offset calculator 250 orchestrates transitions between imaging modes using the displacement step 256.

Upon receiving the mode 235, the eye offset calculator 250 performs a comparison operation between the mode 235 and the rendering mode 252. If the mode 225 and the rendering mode 252 are both the stereoscopic mode, then the eye offset calculator 250 sets the eye offset 260 to the stereo eye offset 258. If the mode 225 and the rendering mode 252 are both the non-stereoscopic mode, then the eye offset calculator 250 sets the eye offset 260 to zero. Otherwise (i.e., the mode 235 and the rendering mode 252 differ), the eye offset calculator 250 sets the rendering mode 252 to the mode 235, sets the rendering state to transitioning, and initiates a gradual transition sequence from the rendering mode 252 to the mode 235.

First, the eye offset calculator 250 selects an optimal length of time for the transition based on the mode 235 and the results of experiments conducted with users. Notably, the experimental results indicate that users are comfortable with more rapid transitions from the stereoscopic imaging mode to the non-stereoscopic imaging mode than with transitions from the stereoscopic imaging mode to the non-stereoscopic imaging mode. Consequently, to minimize the transition times, the eye offset calculator 250 selects a longer transition time when transition to the stereoscopic imaging mode than when transitioning to the non-stereoscopic imaging mode.

In alternate embodiments, the eye offset calculator 250 selects the optimal length of time based on any number of factors. In some embodiments, the eye offset calculator 250 selects the transition time based on the content of the image data 240—varying the transition time based on the depth of the geometric objects included in the image data 240—instead of or in addition to the transition direction.

After selecting the optimized transition time, the eye offset calculator 250 sets the displacement step 256 to implement this transition time. As previously disclosed here, the eye offset 260 controls the offset between the image for left eye 282 and the image for right eye 284 and thus the perceived depth of the image data 240. Consequently, to distribute the impact of the change across the transition time, the eye offset calculator 250 adjusts the eye offset 260 for each frame by the displacement step 256 during the transition time.

As part of initiating a transition to the mode 235 of stereoscopic, the eye offset calculator 250 calculates a positive displacement step 256 based on the frame rate and the stereo eye offset 258. To implement a smooth, linear transition, the eye offset calculator 250 is configured to set the displacement step to the stereo eye offset 258 divided by the number of frames during the optimized transition time. Upon receiving each subsequent frame during the transition time, the eye offset calculator 250 increases the current eye offset 260 by the displacement step 256. After the transition time, the eye offset 260 matches the stereo eye offset 258, and the eye offset calculator 250 sets the rendering state 254 to indicate that the transition is complete.

Similarly, as part of initiating a transition to the mode 235 of non-stereoscopic, the eye offset calculator 250 calculates a negative displacement step 256 based on the number of frames during the optimized transition time and the stereo eye offset 258. To implement a smooth, linear transition, the eye offset calculator 250 is configured to set the displacement step to the stereo eye offset 258 divided by the number of frames during the optimized transition time. Upon receiving each subsequent frame during the transition time, the eye offset calculator 250 increases the current eye offset 260 by the displacement step 256 (i.e., the eye offset calculator incrementally decreases the current eye offset 260). After the transition time, the eye offset 260 is zero and, the eye offset calculator 250 sets the rendering state 254 to indicate that the transition is complete.

In alternate embodiments, the eye offset calculator 250 may select the eye offset 260 and/or adjust the eye offset 260 during the transition in any technically feasible fashion. For example, in some embodiments, the eye offset calculator 250 adjusts the eye offset 260 in a non-linear manner such that the transition between the imaging modes initially proceeds relatively slowly and gradually increases in speed.

Upon receiving the eye offset 260 and the image data 240, the rendering unit 240 generates the image for left eye 254 and the image for right eye 256. The rendering unit 240 may emit the image for left eye 254 and the image for right eye 256 in any technically feasible fashion that reflects both the eye offset 260 and the image data 240. In one implementation, to generate the image for left eye 254 and the image for right eye 256, the rendering unit 240 renders geometries specified in the image data 240 twice. More specifically, the rendering unit 240 applies stereo projection techniques to render the image for left eye 254 based on one camera location and to render the image for right eye 256 based on another camera location. The rendering unit 240 chooses the camera locations to be separated by a distance of the eye offset 260. In some embodiments, if the eye offset 260 is zero, then the rendering unit 240 renders geometries specified in the image data 240 once. In such embodiments, the rendering unit 240 applies perspective projection techniques based on a single camera location and then sets both the image for the left eye 254 and the image for the right eye 256 to the singled rendered image.

In alternate embodiments, the image for left eye 254 and/or the image for right eye 256 may be supplemented and/or replaced with any number and/or type of signals that are consistent with the stereoscopic display device 122. For instance, in embodiments that implement "active stereoscopic 3D," the rendering unit 240 may generate a synchronization signal that causes the stereoscopic display device 122 to temporally alternate between the image for left eye 254 and the image for right eye 254.

Figure 3:
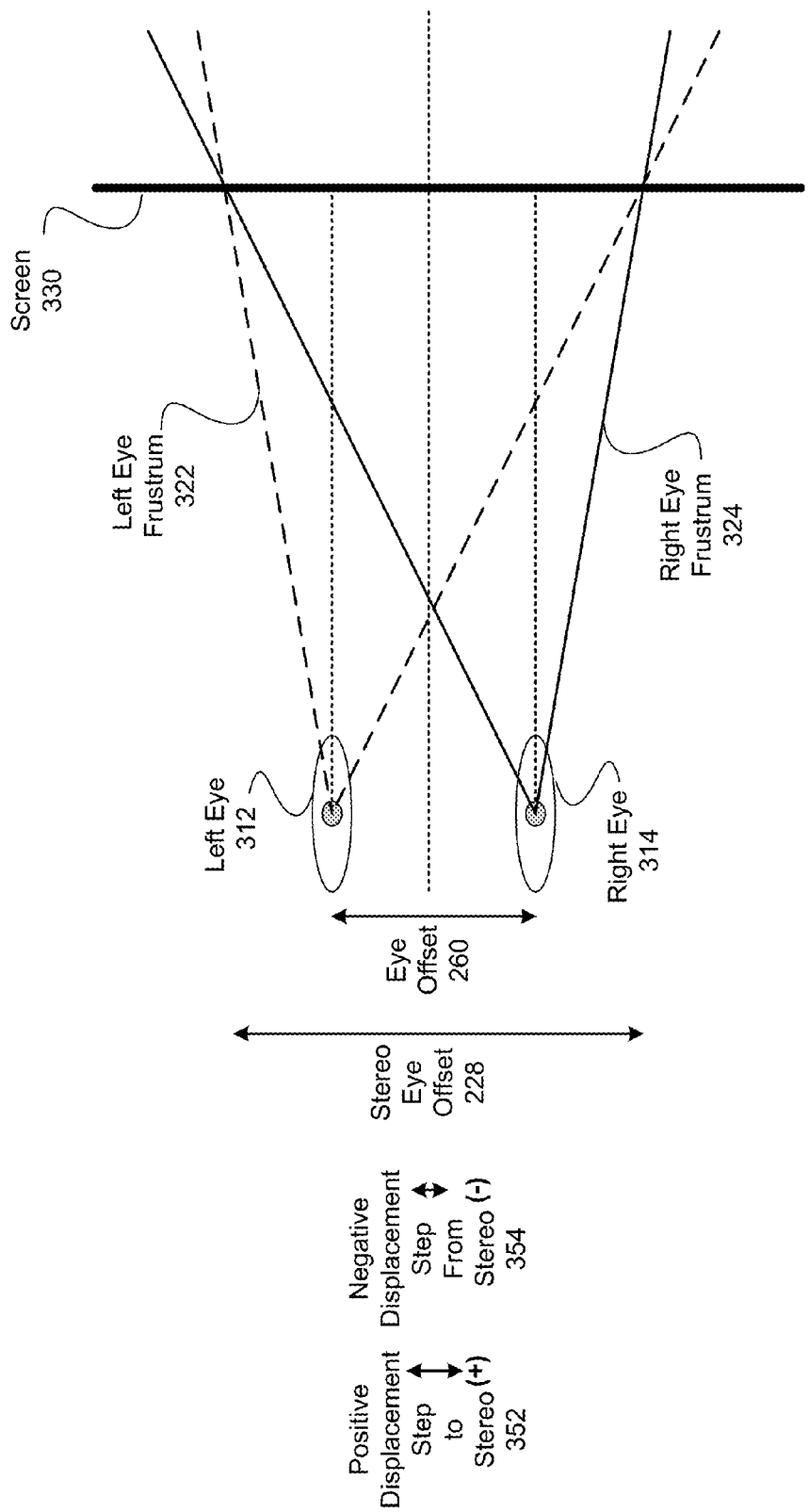
FIG. 3 is a conceptual diagram illustrating the eye offset of FIG. 2, according to one embodiment of the present invention.

FIG. 3 is a conceptual diagram illustrating the eye offset 260 of FIG. 2, according to one embodiment of the present invention. For explanatory purposes only, FIG. 3 depicts a screen 330, a left eye 312, and a right eye 314 during a transition between the mode 235 of stereoscopic and the mode 235 of non-stereoscopic. The screen 330 is included in the stereoscopic display device 122. The left eye 312 and the right eye 314 illustrate the two eyes of a user that is viewing the stereoscopic display device 122.

As shown, the left eye 312 and the right eye 314 are separated by the eye offset 260. As persons skilled in the art will understand, to ensure that the objects viewed by the user line up in the same plane, the left eye frustum 322 and the right eye frustum 324 may both be asymmetrical. The rendering unit 240 may specify and implement these frustums in any technically feasible fashion. For example, using a commercial application user interface, the rendering unit 240 may specify the field of view, the aspect ratio of the stereoscopic display device 122, the near and far clipping planes, and the location of the eye.

Since the hybrid subsystem 130 is transitioning between imaging modes, the eye offset 260 is positive and less than the stereo eye offset 258. If the hybrid subsystem 130 is transitioning to the mode 235 of stereoscopic, then the displacement step 256 matches a "positive displacement step to stereo" 352. If the hybrid subsystem 130 is transitioning to the mode 235 of non-stereoscopic, then the displacement step 256 matches a "negative displacement step from stereo" 354. As show, the magnitude of the "positive displacement step to stereo" 352 is smaller than the magnitude of the "negative displacement step from stereo" 354, thereby enforcing a longer transition time when transitioning to stereoscopic imaging than when transitioning to non-stereoscopic imaging.

Regardless of the mode 235 and the rendering state 254 (i.e., transitioning or stable) the rendering unit 270 generates the image for both the image for left eye 254 and the image for right eye 256 based on a consistent set of visual data—the image data 240. Consequently, the stereoscopic display unit 122 continuously displays a cohesive view of the image source 140.

Integrating Non-Stereoscopic and Stereoscopic Imaging

Figure 4:
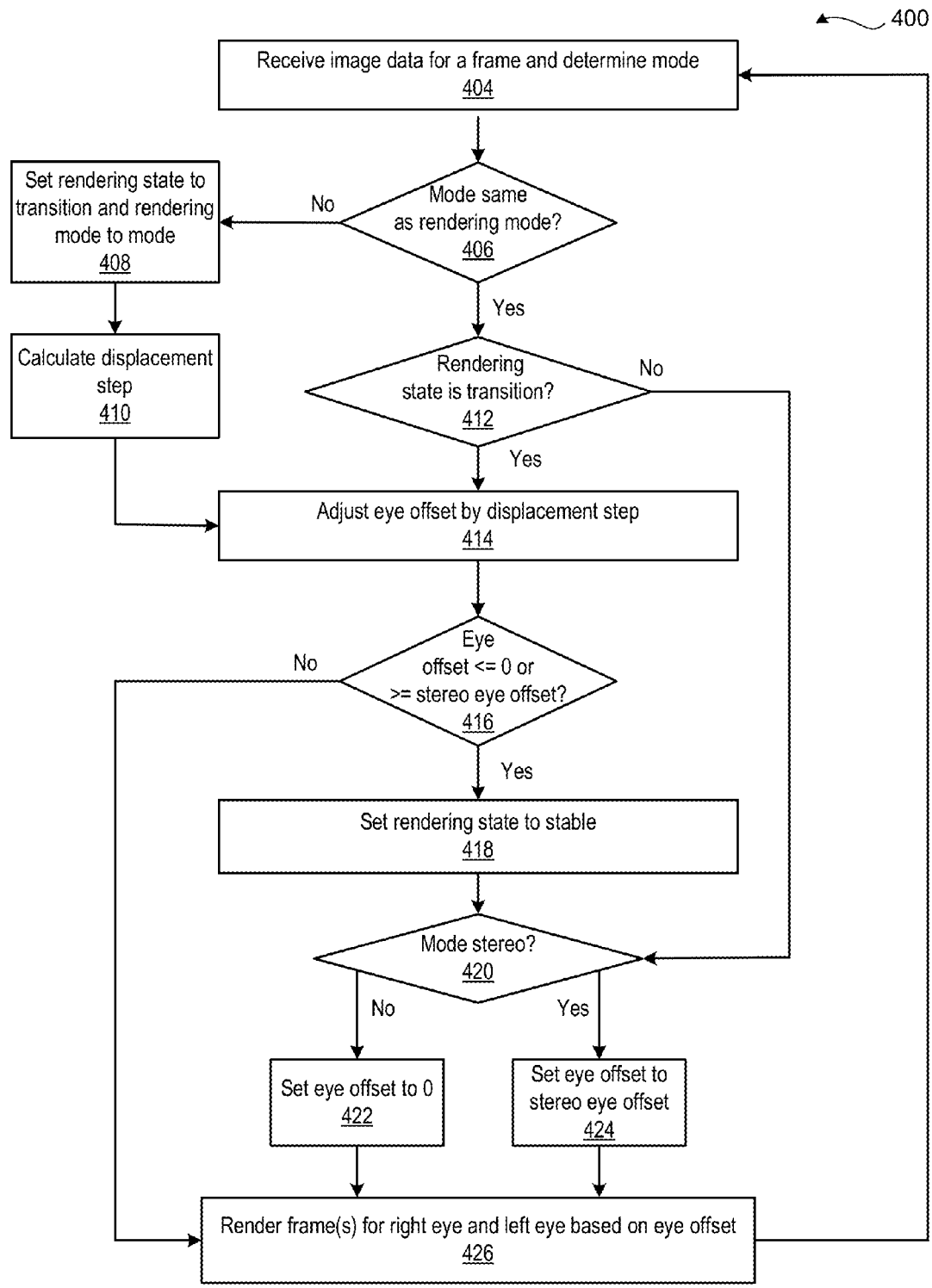
FIG. 4 is a flow diagram of method steps for integrating non-stereoscopic and stereoscopic imaging, according to one embodiment of the present invention.

FIG. 4 is a flow diagram of method steps for integrating non-stereoscopic and stereoscopic imaging, according to one embodiment of the present invention. Although the method steps are described in conjunction with the systems of FIGS. 1-3, persons skilled in the art will understand that any system configured to implement the method steps, in any order, falls within the scope of the present invention.

As shown, a method 400 begins at step 404, where the hybrid engine 230 generates image data 240 for a frame and determines the mode 235. At step 406, the eye offset calculator 250 compares the mode 235 to the rendering mode 254 (i.e., the value of the mode 235 for the immediately preceding frame). If, at step 406, the eye offset calculator 250 determines that the value of mode 235 matches the value of the rendering mode 254, then the method 400 proceeds directly to step 412. If, at step 406, the eye offset calculator 250 determines that the value of the mode 235 does not match the value of the rendering mode 254, then the method 400 proceeds to step 408.

At step 408, the eye offset calculator 250 initiates a transition from the rendering mode 254 to the mode 235. As part of initiating this transition, the eye offset calculator 250 sets the rendering state 254 to "transitioning" and sets the value of the rendering mode 254 to the value of the mode 235. At step 410, the eye offset calculator 250 determines an optimized transition time and, based on the optimized transition time and the stereo eye offset 258, calculates the per-frame displacement step 256 during the transition.

In general, if the value of the mode 235 is "stereoscopic," then the transition is from the non-stereoscopic mode to the stereoscopic mode. Consequently, to implement a gradual change from the eye offset 260 of zero to the eye offset 260 that equals the stereo eye offset 258, the eye offset calculator 250 sets the displacement step 256 to a positive value. By contrast, if value of the mode 235 of "non-stereoscopic," then the transition is from the stereoscopic mode to the non-stereoscopic mode. Consequently, to implement a gradual change from the eye offset 260 that equals the stereo eye offset 258 to the eye offset 260 of zero, the eye offset calculator 250 sets the displacement step 256 to a negative value. As detailed in conjunction with FIG. 2, the eye offset calculator 250 determines the optimized transition time in any technically feasible fashion that avoids the discomfort to the user that is attributable to more immediate transitions between stereoscopic imaging and non-stereoscopic imaging in conventional imaging systems. The method 400 then proceeds directly to step 414.

At step 412, the eye offset calculator 250 determines whether the value of the rendering state 254 is "transitioning" or "stable." If, at step 412, the eye offset calculator 250 determines that the value of the rendering state 254 is "stable," then the method 400 proceeds directly to step 420. If, at step 412, the eye offset calculator 250 determines that the value of the rendering state 254 is "transitioning," then the method 400 proceeds to step 414.

At step 414, the eye offset calculator 250 performs an addition operation between the eye offset 260 and the displacement step 256. Notably, the displacement step 256 was previously set when the eye offset calculator 250 initiated the current transition as part of step 408. Accordingly, if the mode 235 is "stereoscopic," then the addition operation increases the eye offset 260. If the mode 235 is "non-stereoscopic," then the addition operation decreases the eye offset 260.

At step 416, the eye offset calculator 250 determines whether the eye offset 260 lies between zero and the value of the stereo eye offset 258 (exclusive). If, at step 416, the eye offset calculator 250 determines that the eye offset 260 lies between zero and the value of the stereo eye offset 258, then the eye offset calculator 250 identifies that the hybrid subsystem 130 is transitioning between imaging modes, and the method 400 proceeds directly to step 426.

If, at step 416, the eye offset calculator 250 determines that the eye offset 260 does not lie between zero and the value of the stereo eye offset 258, then the eye offset calculator 250 identifies that the hybrid subsystem 130 has finished transitioning between imaging modes, and the method 400 proceeds to step 418, where the eye offset calculator 250 sets the rendering state 254 to "stable."

At step 420, the eye offset calculator 250 determines whether the mode 235 is "stereoscopic." If, at step 420, the eye offset calculator 250 determines that mode 235 is "stereoscopic," then the method proceeds directly to step 424, where the eye offset calculator 250 sets the value of the eye offset 260 to the value of the stereo eye offset 258. If, at step 420, the eye offset calculator 250 determines that mode 235 is not "stereoscopic," then the method 400 proceeds to step 422, where the eye offset calculator 250 sets the value of the eye offset 260 to zero. The method 400 then proceeds directly to step 426.

At step 426, the rendering unit 270 receives the eye offset 260 and the image data 240. In response, the rendering unit 240 generates the image for left eye 254 and the image for right eye 256. The rendering unit 240 may emit the image for left eye 254 and the image for right eye 256 in any technically feasible fashion that reflects both the eye offset 260 and the image data 240. In one implementation, to generate the image for left eye 254 and the image for right eye 256, the rendering unit 240 renders geometries specified in the image data 240 twice. More specifically, the rendering unit 240 applies stereo projection techniques to render the image for left eye 254 based on one camera location and to render the image for right eye 256 based on another camera location. The rendering unit 240 chooses the camera locations to be separated by a distance of the eye offset 260. In some embodiments, if the eye offset 260 is zero, then the rendering unit 240 renders geometries specified in the image data 240 once and then sets both the image for the left eye 254 and the image for the right eye 256 to the singled rendered image. The method 400 then returns to step 404, where the hybrid engine 230 processes the next frame.

In sum, the disclosed techniques may be used to efficiently optimize the viewing of 3D visual content, such as television broadcasts. In operation, a hybrid subsystem renders and transmits two images to a stereoscopic display device—a left eye image and a right eye image that is offset from the left eye image. The hybrid subsystem controls the offset between the two images to enable both stereoscopic imaging and non-stereoscopic imaging. When operating in a stereoscopic mode, the hybrid subsystem sets the offset to a non-zero value that corresponds to the eye separation of a typical user. By contrast, when the hybrid subsystem is operating in a non-stereoscopic mode, the hybrid subsystem sets the offset to zero, thereby rendering the same image to both eyes.

Upon determining to switch between stereoscopic and non-stereoscopic modes, the hybrid subsystem orchestrates a gradual transition between the modes. For each transition, the hybrid subsystem selects a displacement step based on the transition direction and/or the content of the image. Subsequently, before rendering each frame during the transition, the hybrid subsystem adjusts the offset by the displacement step. More specifically, during the transition from stereoscopic mode to non-stereoscopic mode, the hybrid subsystem gradually decreases the offset between the left eye image and the right eye image until the offset is zero. By contrast, during the transition from non-stereoscopic mode to stereoscopic mode, the hybrid subsystem gradually increases the offset between the left eye image and the right eye image until the offset corresponds to the eye separation of a typical user.

Advantageously, gradually switching between a stereoscopic imaging mode and a non-stereoscopic imaging mode provides a flexible, cohesive, and comfortable viewing experience for users. Notably, because the hybrid subsystem incrementally changes the perceived depth of images, the disclosed imaging transition techniques allow the eyes to continuously adjust throughout the transition in a more non-disruptive manner that is less perceptible to users. By contrast, conventional imaging switching techniques that abruptly cut between stereoscopic images and non-stereoscopic images produce noticeable and jarring change in perceived depth that can cause discomfort for users.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for animating a transition between stereoscopic imaging and non-stereoscopic imaging, the method comprising:
   receiving first image data and a first mode;
   determining a first state based on the first mode;
   determining a transition time based on the first mode and depth values associated with a plurality of geometric objects included in the first image data, wherein the transition time is longer when the first mode comprises a non-stereographic mode than when the first mode comprises a stereographic mode;
   determining a displacement step based on a selected offset distance between a left eye image and a right eye image and a total number of transition frames to be rendered in the transition time, wherein the displacement step is smaller than the selected offset distance and represents an amount by which a distance between the left eye image and the right eye image changes at each frame included in the transition frames;

based on the first state comprising a stable state and the first mode comprising the stereographic mode, setting an offset to a predetermined eye separation distance that is greater than zero;

based on the first state comprising a stable state and the first mode comprising the non-stereographic mode, setting the offset to zero;

based on the first state comprising a transition state, setting the offset to a value that is less than the predetermined eye separation distance and greater than zero, wherein the value is based at least in part on the displacement step;

calculating a first left eye position and a first right eye position, wherein the first right eye position is separated from the first left eye position by the offset;

generating a left eye image for display based on the first left eye position and the first image data; and generating a right eye image for display based on the first right eye position and the first image data.

2. The method of claim 1, wherein the first state is the transition state, the first mode is the non-stereographic mode, and setting the offset comprises performing a subtraction between the predetermined eye separation distance and the displacement step.

3. The method of claim 1, wherein the first state is the transition state and setting the offset comprises performing an addition operation between a previous offset and the displacement step.

4. The method of claim 1, further comprising calculating the total number of transition frames based on the transition time and a frame rate.

5. The method of claim 1, wherein determining the displacement step comprises:

if the first mode is the non-stereoscopic mode then setting the displacement step to a first step, wherein the first step is less than zero; and if the first mode is the stereoscopic mode, then setting the displacement step to a second step, wherein the second step is greater than zero.

6. The method of claim 5, wherein a magnitude of the first step is greater than the magnitude of the second step.

7. The method of claim 5, wherein a magnitude of the first step is equal to the magnitude of the second step.

8. A non-transitory computer-readable storage medium including instructions that, when executed by a processing unit, cause the processing unit to animate a transition between stereoscopic and non-stereoscopic imaging, by performing the steps of:

receiving first image data and a first mode;

determining a first state based on the first mode;

determining a transition time based on the first mode and depth values associated with a plurality of geometric objects included in the first image data, wherein the transition time is longer when the first mode comprises a non-stereographic mode than when the first mode comprises a stereographic mode;

determining a displacement step based on an selected offset distance between a left eye image and a right eye image and a total number of transition frames to be rendered in the transition time, wherein the displacement step is smaller than the selected offset distance and represents an amount by which a distance between the left eye image and the right eye image changes at each frame included in the transition frames;

based on the first state comprising a stable state and the first mode comprising the stereographic mode, setting an offset to a predetermined eye separation distance that is greater than zero;

based on the first state comprising a stable state and the first mode comprising the non-stereographic mode, setting the offset to zero;

based on the first state comprising a transition state, setting the offset to a value that is less than the predetermined eye separation distance and greater than zero, wherein the value is based at least in part on the displacement step;

calculating a first left eye position and a first right eye position, wherein the first right eye position is separated from the first left eye position by the offset;

generating a left eye image for display based on the first left eye position and the first image data; and generating a right eye image for display based on the first right eye position and the first image data.

9. The non-transitory computer-readable storage medium of claim 8, wherein the first state is the transition state, the first mode is the non-stereographic mode, and setting the offset comprises performing a subtraction between the predetermined eye separation distance and the displacement step.

10. The non-transitory computer-readable storage medium of claim 8, wherein the first state is the transition state and setting the offset comprises performing an addition operation between a previous offset and the displacement step.

11. The non-transitory computer-readable storage medium of claim 8, further comprising determining the displacement step based on at least one of the first image data and the first mode.

12. The non-transitory computer-readable storage medium of claim 10, wherein determining the displacement step comprises:

if the first mode is the non-stereoscopic mode, then setting the displacement step to a first step, wherein the first step is less than zero; and if the first mode is the stereoscopic mode, then setting the displacement step to a second step, wherein the second step is greater than zero.

13. The non-transitory computer-readable storage medium of claim 12, wherein a magnitude of the first step is greater than the magnitude of the second step.

14. The non-transitory computer-readable storage medium of claim 8, wherein generating the left eye image comprises rendering the first image data based on the first left eye position.

15. An imaging system configured to animate a transition between stereoscopic and non-stereoscopic imaging, the system comprising:

a stereoscopic display device;

a hybrid subsystem that is coupled to the stereoscopic displace device and includes:

a hybrid engine configured to:

generate first image data and a first mode;

an eye offset calculator configured to:

determine a first state based on the first mode;

determine a transition time based on the first mode and depth values associated with a plurality of geometric objects included in the first image data, wherein the transition time is longer when the first mode comprises a non-stereographic mode than when the first mode comprises a stereographic mode;

determine a displacement step based on an selected offset distance between a left eye image and a right eye image and a total number of transition frames to be rendered in the transition time, wherein the displacement step is smaller than the selected offset distance and represents an amount by which a distance between the left eye image and the right eye image changes at each frame included in the transition frames;

based on the first state comprising a stable state and the first mode is the stereographic mode, set an offset to a predetermined eye separation distance that is greater than zero;

based on the first state comprising a stable state and the first mode is the non-stereographic mode, set the offset to zero;

if based on first state comprising a transition state, set the offset to a value that is less than the predetermined eye separation distance and greater than zero, wherein the value is based at least in part on the displacement step; and a rendering unit configured to:
calculate a first left eye position and a first right eye position, wherein the first right eye position is separated from the first left eye position by the offset;

generate a left eye image for display based on the first left eye position and the first image data; and generate a right eye image for display based on the first right eye position and the first image data.

16. The imaging system of claim 15, wherein the first state is the transition state, the first mode is the non-stereographic mode, and setting the offset comprises performing a subtraction between the predetermined eye separation distance and the displacement step.

17. The imaging system of claim 15, wherein the first state is the transition state and setting the offset comprises performing an addition operation between a previous offset and the displacement step.

* * * * *